US006962501B1

(12) United States Patent
Chou

(10) Patent No.: US 6,962,501 B1
(45) Date of Patent: Nov. 8, 2005

(54) HOUSING FOR POWER SUPPLY DEVICE

(76) Inventor: Ching Lin Chou, P.O. Box 63-99, Taichung (TW) 406

( * ) Notice: Subject to any disclaimer, the term of this patent is extended or adjusted under 35 U.S.C. 154(b) by 0 days.

(21) Appl. No.: 10/911,355

(22) Filed: Aug. 5, 2004

(51) Int. Cl.⁷ .......................................... H01R 29/00
(52) U.S. Cl. .................................. 439/170; 439/540.1
(58) Field of Search ............................... 439/166, 170, 439/217, 218, 956, 540.1, 564

(56) References Cited

U.S. PATENT DOCUMENTS

| | | | | |
|---|---|---|---|---|
| 3,784,962 A | * | 1/1974 | Byrd .......................... 439/532 |
| 4,911,649 A | * | 3/1990 | Helmich, Jr. ................ 439/170 |
| 5,519,573 A | * | 5/1996 | Cobb et al. .................. 361/686 |
| 5,564,930 A | * | 10/1996 | Yu ............................... 439/61 |
| 5,577,923 A | * | 11/1996 | Lee ............................ 439/170 |
| 5,650,911 A | * | 7/1997 | Scholder et al. ............ 361/684 |
| 5,898,130 A | * | 4/1999 | Tansi et al. .................... 174/66 |
| 5,934,775 A | * | 8/1999 | Ho ........................... 312/223.2 |
| 6,347,949 B1 | * | 2/2002 | Edwards et al. ............ 439/170 |
| D460,736 S | * | 7/2002 | Pincek et al. ............ D13/139.4 |
| 6,547,579 B2 | * | 4/2003 | Kupnicki et al. ........... 439/260 |
| 6,773,282 B2 | * | 8/2004 | Alvey ......................... 439/170 |
| 2002/0009931 A1 | * | 1/2002 | Lacoy ......................... 439/687 |
| 2002/0106935 A1 | * | 8/2002 | Udd ......................... 439/540.1 |
| 2003/0232530 A1 | * | 12/2003 | Vista et al. ................. 439/170 |

* cited by examiner

*Primary Examiner*—Ross Gushi
*Assistant Examiner*—Larisa Tsukerman
(74) *Attorney, Agent, or Firm*—Birch, Stewart, Kolasch & Birch, LLP

(57) ABSTRACT

A power supply device includes a housing having a rear board which has one or more air passages for air circulating purposes, and which has one or more orifices. Two or more panels may be selectively attached to the rear board of the housing, to selectively enclose the orifices of the rear board, and each includes a number of socket openings for plugging different facilities. The panels may be selectively or changeably attached or secured to the rear board of the housing, to allow different or various facilities to plug or to couple to the housing of the power supply.

8 Claims, 4 Drawing Sheets

HOUSING FOR POWER SUPPLY DEVICE

BACKGROUND OF THE INVENTION

1. Field of the Invention

The present invention relates to a power supply device, and more particularly to a power supply device including a housing having changeable socket openings provided in selectively attachable or changeable panels.

2. Description of the Prior Art

As shown in FIG. 1, illustrated is one of the typical power supply devices 1 for coupling to computer facilities, and for allowing peripheral facilities of the computer facilities to be coupled to suitable electric power supplies.

For example, the typical power supply device 1 comprises a housing 10 including a rear board 11 having one or more air passages 12 for air circulating purposes, and/or for attaching fan devices (not shown) thereto, and having a number of socket openings 13, 14, 15 formed therein, for allowing the peripheral facilities of the computer facilities to be plugged thereto.

However, normally, the socket openings 13, 14, 15 are solidly formed in the rear board 11, and may thus be provided for allowing only the predetermined peripheral facilities of the computer facilities to be plugged thereto. The other peripheral facilities of the computer facilities may not be plugged to the socket openings 13, 14, 15 of the rear board 11 when the other peripheral facilities have different plugs or couplers.

The present invention has arisen to mitigate and/or obviate the afore-described disadvantages of the conventional housing for power supply devices.

SUMMARY OF THE INVENTION

The primary objective of the present invention is to provide a power supply device including a housing having changeable socket openings provided in changeable panels that may be selectively attached or secured to the power supply housing, for allowing various or different plugs of peripheral facilities of computer facilities to plug thereto.

In accordance with one aspect of the invention, there is provided a power supply device comprising a housing including a rear board having at least one air passage formed therein for air circulating purposes, and having at least one orifice formed therein, a first panel selectively attachable to the rear board of the housing, and including a plurality of socket openings formed therein for plugging different facilities, and at least one second panel selectively attachable to the rear board of the housing when the first panel is removed from the housing, and including a plurality of socket openings formed therein for plugging different facilities.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
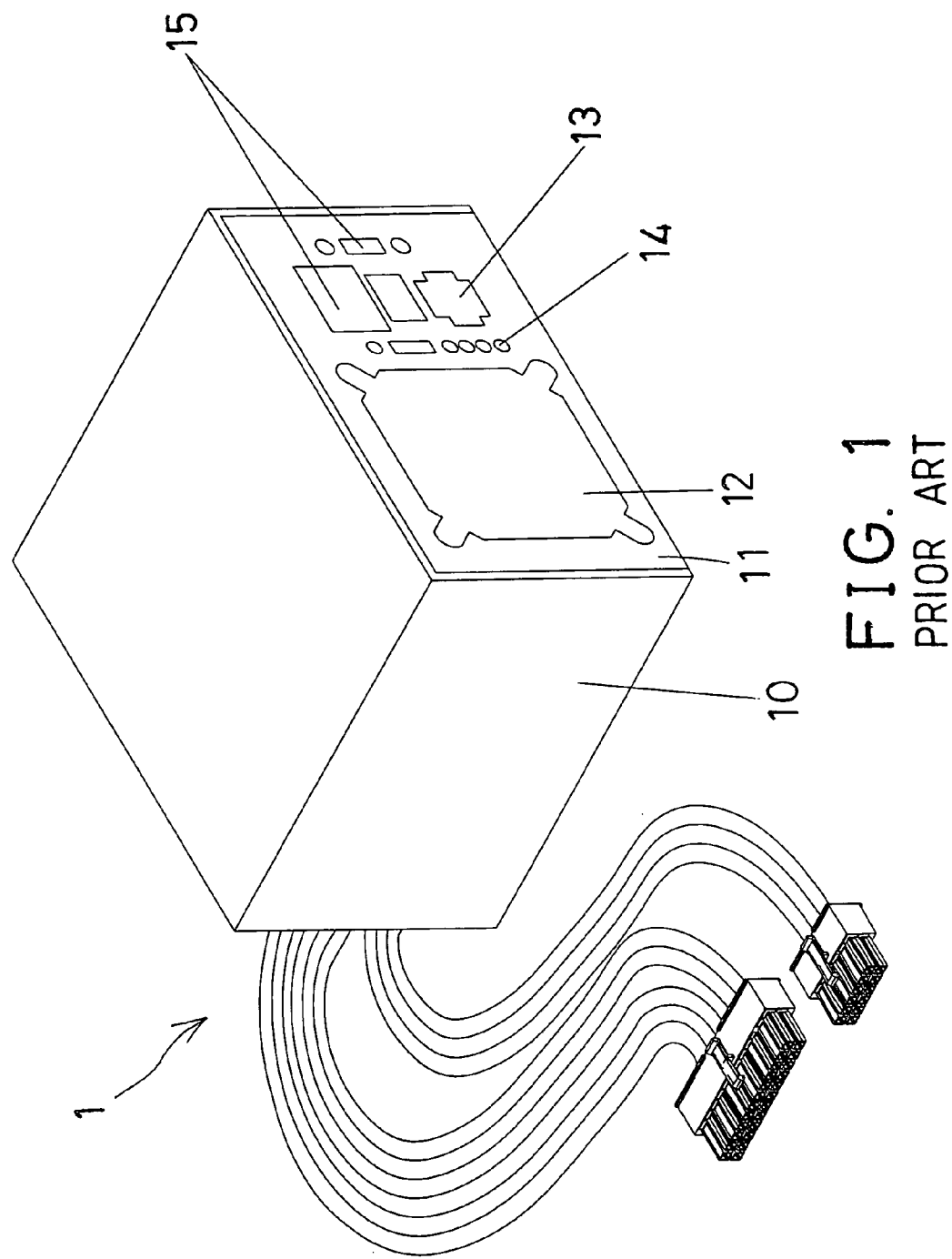
FIG. 1 is a perspective view illustrating a typical housing for power supply devices.
Figure 2:
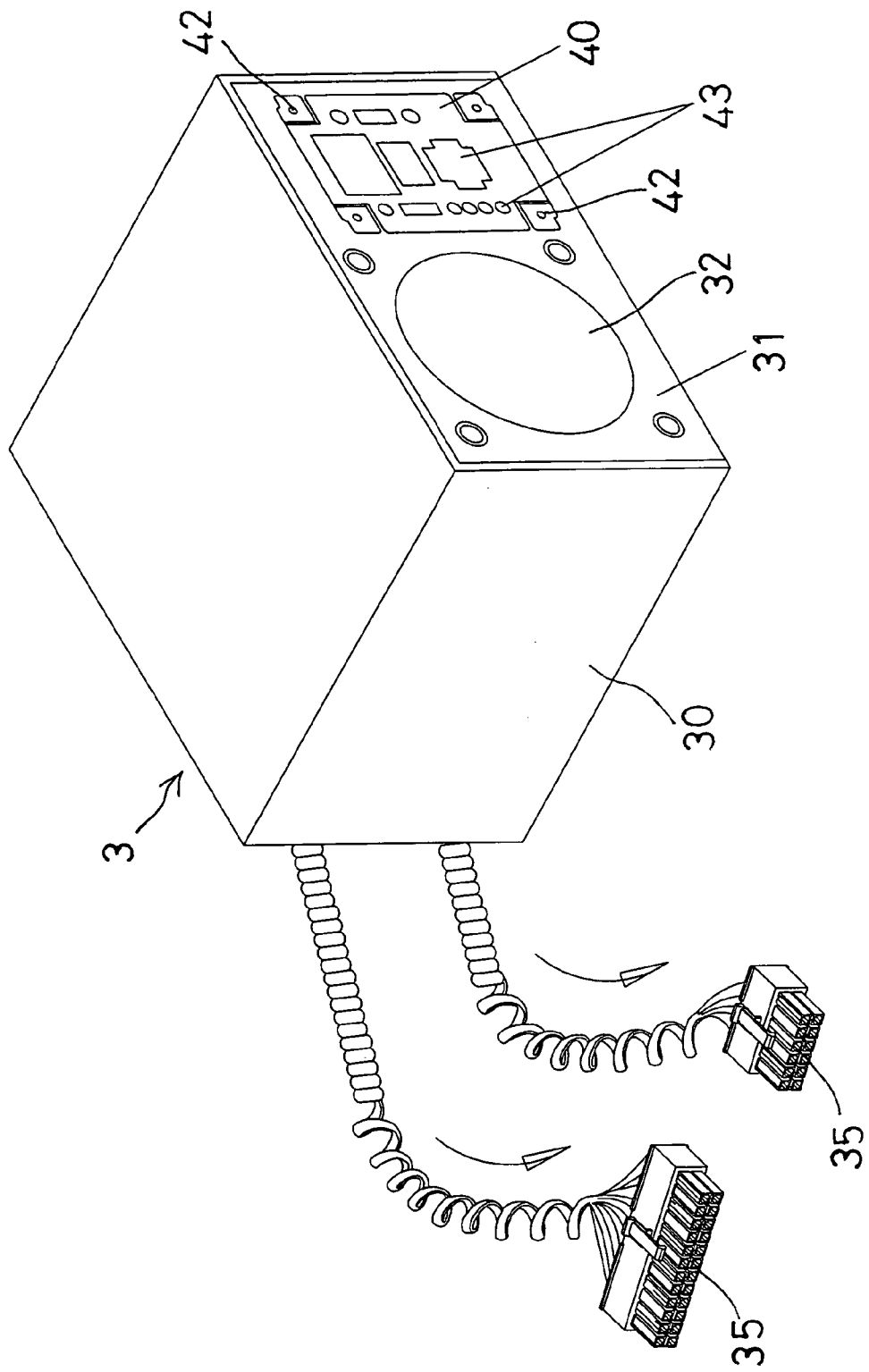
FIG. 2 is a perspective view of a housing for a power supply device in accordance with the present invention.
Figure 3:
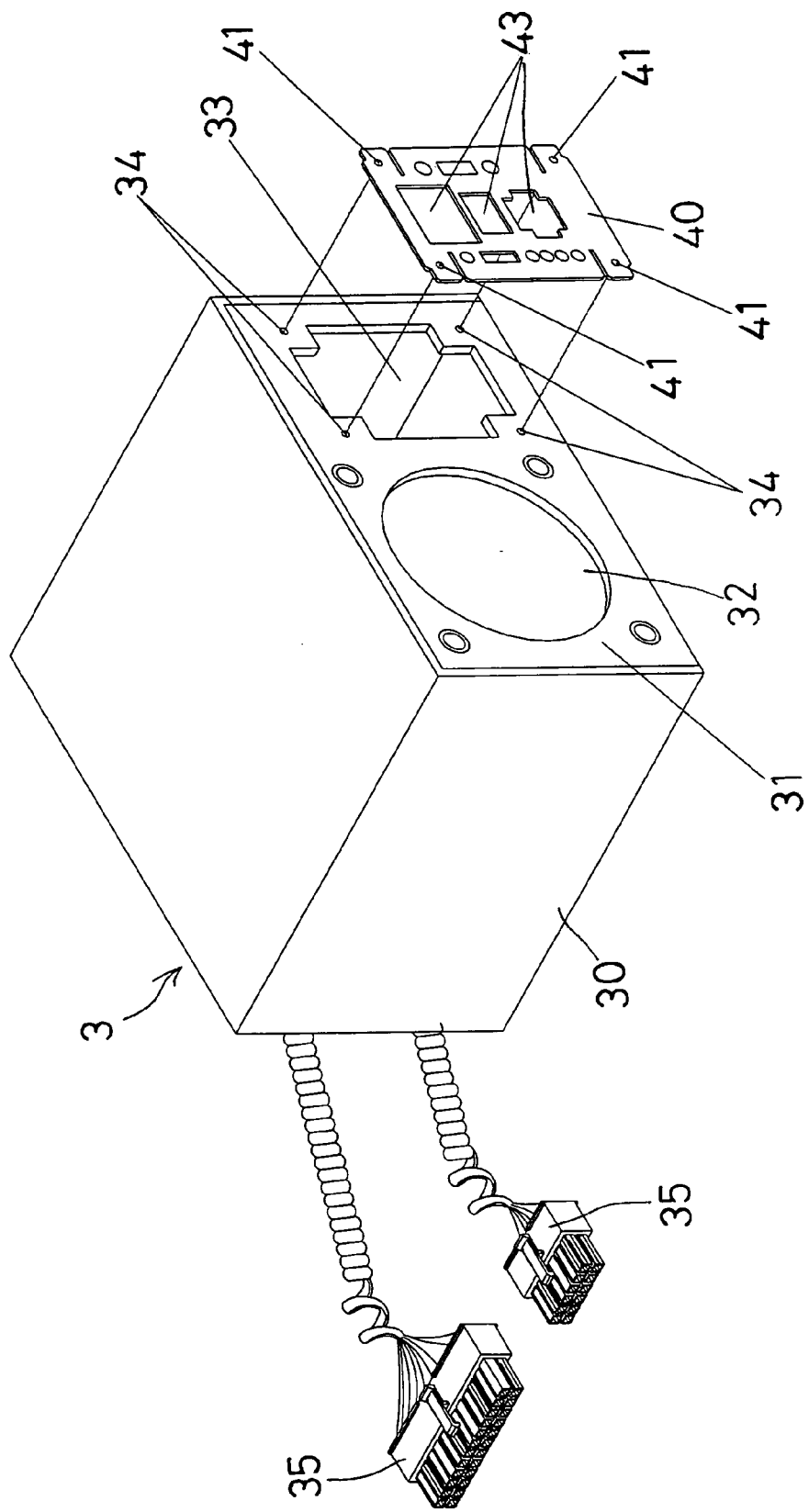
FIG. 3 is a partial exploded view of the housing for the power supply device.
Figure 10:
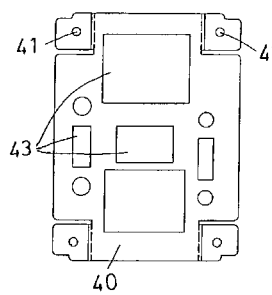
FIGS. 5, 6, 7, 8, 9, 10 are plan views similar to FIG. 4, illustrating the other arrangements of the selectively attachable or changeable panel for the housing of the power supply device.
Figure 9:
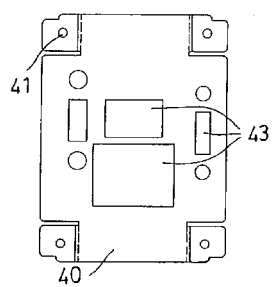
Figure 8:
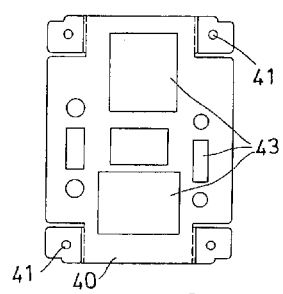
Figure 7:
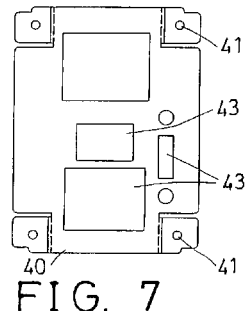
Figure 6:
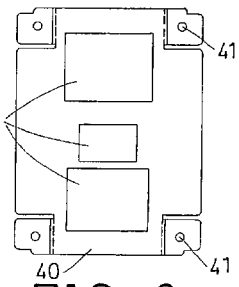
Figure 5:
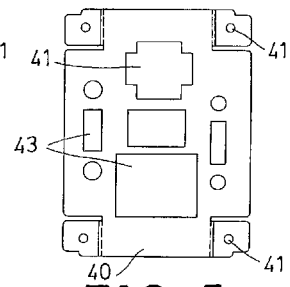
Figure 4:
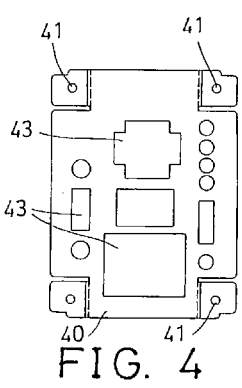
FIG. 4 is a plan view of a selectively attachable or changeable panel for the housing of the power supply device.

Referring to the drawings, and initially to FIGS. 2–4, a power supply device 3 in accordance with the present invention comprises a housing 30 including a rear board 31 having one or more air passages 32 formed therein for air circulating purposes, and/or for attaching fan devices (not shown) thereto, and having one or more orifices 33 formed therein, and a number of holes 34 formed therein and arranged around the orifices 33 thereof.

The housing 30 of the power supply device 3 further includes one or more panels 40 (FIGS. 4–10) each having a number of apertures 41 formed therein and arranged around the peripheral portion thereof, for aligning with the holes 34 of the rear board 31 of the housing 30, and for receiving fasteners 42 (FIG. 2) which may selectively or changeably secure the panels 40 to the rear board 31 of the power supply housing 30, to enclose the orifices 33 of the rear board 31 of the housing 30.

Each of the panels 40 includes a number of socket openings 43 formed therein and having different or various contours or shapes or configurations for allowing different or various peripheral facilities of computer facilities (not shown) to be plugged thereto or therethrough. The power supply device 3 may further include one or more plugs or couplers 35 for coupling to the computer facilities and/or power suppliers.

Accordingly, the housing of the power supply device in accordance with the present invention includes one or more panels that may be selectively or changeably attached or secured to the power supply housing and each having a number of socket openings provided therein for allowing various or different plugs of peripheral facilities of computer facilities to plug thereto.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A power supply device comprising:
    a housing including a rear board, said rear board having at least one air passage formed therein for air circulation, and having at least one orifice formed therein,
    a first panel selectively attachable to said rear board of said housing, said first panel including a first group of outlet openings formed therein, a plurality of power plugs of a first group of facilities being receivable by the first group of outlet openings, and
    at least one second panel selectively attachable to said rear board of said housing when said first panel is removed from said housing, said second panel including a second group of outlet openings formed therein, a plurality of power plugs of a second group of facilities being receivable by the second group of outlet openings, a configuration of the first group of outlet openings being different from a configuration of the second group of outlet openings.

2. The power supply device of claim 1, wherein the at least one air passage and the first panel occupy more than a half space of the rear board.

3. The power supply device of claim 2, wherein access to an electrical power supplied by an interior component of the housing is provided through the first group of outlet openings.

4. The power supply device of claim 3, wherein the rear board has a plurality of holes and each of the first panel and the second panel has a plurality of apertures corresponding to the plurality of holes for fixing one of each of the first panel and the second panel onto the rear board by a plurality of fasteners.

5. The power supply device of claim 4, wherein the first panel or the second panel is fixed onto the rear board from an exterior side of the housing.

6. The power supply device of claim 5, wherein each of the first panel and the second panel has a rectangular shape, the plurality of apertures being located at four corners of the first panel and the second panel.

7. The power supply device of claim 6, wherein the configuration of at least one of the first group of outlet openings and the second group of outlet openings has a plurality of rows and a plurality of columns.

8. The power supply device of claim 7, wherein a first outlet opening of the first group of outlet openings has a different shape from a second outlet opening of the first group of outlet openings.

* * * * *